March 9, 1965

D. B. LIVINGSTONE 3,172,134

CABIN WITH PONTOONS

Filed Nov. 12, 1963

Dixon B. Livingstone
INVENTOR.

BY
Ramsey, Kolisch & Hartwell
Attys.

March 9, 1965   D. B. LIVINGSTONE   3,172,134
CABIN WITH PONTOONS

Filed Nov. 12, 1963   3 Sheets-Sheet 3

Dixon B. Livingstone
INVENTOR.

BY Ramsey, Kolisch & Hartwell
Attys.

United States Patent Office 3,172,134
Patented Mar. 9, 1965

3,172,134
CABIN WITH PONTOONS
Dixon B. Livingstone, 2849 NW. Ariel Terrace,
Portland, Oreg.
Filed Nov. 12, 1963, Ser. No. 322,722
11 Claims. (Cl. 9—1)

This invention relates to marine vehicles including pontoon apparatus adapted buoyantly to support the vehicle on the water. The pontoon apparatus may be incorporated with conventional campers, house trailers, and other land vehicles to produce amphibious vehicles.

In recent years, considerable interest has developed in water activities such as skiing, fishing, and cruising. Further, many people experience enjoyment out of owning campers or house trailers which provide mobile living quarters. A specific embodiment of this invention comprises pontoon apparatus which may be incorporated with the hollow body or cabin of a camper or house trailer, whereby such may be made into a form of houseboat having a remarkable degree of maneuverability on the water.

Generally, an object of this invention is to provide novel means including pontoons, for supporting the cabin of a camper or house trailer on the water, where the pontoons are adjustable between a position adjacent the top of the cabin (the road transport position for the pontoons) and a position under the cabin of the trailer (to adapt it for marine use).

The usual vehicle when it travels over the road is continuously subjected to road jars, vibration, wind gusts, etc. This invention contemplates a novel construction where the pontoons are held firmly in their elevated or road transport position out of contact with the cabin of the vehicle, but in a manner fully capable of withstanding the jars, vibrations, etc. usually associated with travel over the road.

A preferred embodiment of the invention comprises a pair of pontoons connected to the frame of a house trailer by means accommodating shifting of the pontoons between three distinct positions and holding of the pontoons in each of these three positions. The pontoons in one of their positions are preferably over the top of the hollow body or cabin of the house trailer, and this is the road transport position for the pontoons. Because the pontoons are over the top of the cabin, they may be placed inwardly of the sides of the cabin, thus to reduce to a minimum the overall width of the vehicle. The pontoons in another of their positions are located adjacent the sides of the trailer, near the bottom of the trailer cabin, but somewhat above the base of the wheels supporting the trailer. This is referred to herein as a "launch" position for the pontoons, because the pontoons in this position are capable of floating the cabin of the trailer, but are not so low as to prevent the trailer from rolling on its wheels. With the pontoons in their launch position, the vehicle may be backed into the water, until a sufficient water depth is reached to enable the pontoons to float. The pontoons also have a "full float" position, where the pontoons are even lower on the vehicle than they are in their just-mentioned launch position. With the pontoons in their full float position, the base of the cabin in the trailer, and preferably the trailer frame and its wheels, are maintained out of the water.

With pontoons that are shiftable between transport, launch, and float positions, as just described it has been found that best results are obtained including maximum ease of pontoon adjustment, if the pontoons are kept upright and moved substantially vertically relative to the trailer when shifting them between their launch and float positions. In shifting the pontoons between their launch and elevated or road transport positions, some lateral movement as well as vertical movement is required in the pontoons, in order for the pontoons ultimately to be positioned inwardly of the sides of the trailer and over the top thereof. This invention further contemplates, as an object thereof, novel structure whereby pontoons may be shifted in this manner, i.e., along substantially vertical paths when moving between float and launch positions, and along paths which include a lateral component of movement, when moving the pontoons between their launch and their elevated or road transport positions.

A still further object of the invention is to provide novel truss structure for supporting the pontoons, which is an integral part of the frame of the usual trailer. With the truss structure contemplated, the pontoons are firmly supported in their elevated or road transport position, independently of the cabin of the trailer, which usually is not built to withstand the stressing that would result were the pontoons to rest directly on the cabin. The truss structure is made in such a manner as to accommodate shifting of the pontoons easily from their fully raised position, to their other positions.

Yet another object of the invention is to provide a novel amphibious vehicle, where pontoons are provided which project beyond at least one and preferably both ends of a hollow body or cabin in the vehicle, and which further includes platform structure which is swingable over a projecting set of ends of the pontoons to complete a deck extending between the pontoons when they are in their full-float position.

A related object is to provide such a vehicle including such platform structure, where the platform structure functions to provide the transom present in conventional boats. This enables the attachment of means such as an outboard motor to the vehicle, for the purpose of propelling the vehicle over the water.

A further object of the invention is to provide pontoon structure, for campers, trailers and related vehicles, which is relatively light in weight and contributes a minimum of bulk to the vehicle. The pontoon structure offers minimal impairment to the maneuverability of the vehicle when the same is used as a land vehicle.

A related feature is to provide pontoon structure for a vehicle which is relatively economically manufactured, and easily installed.

These and other objects and advantages are attained by the invention, and the same is described hereinbelow in connection with the accompanying drawings, wherein.

Figure 1:
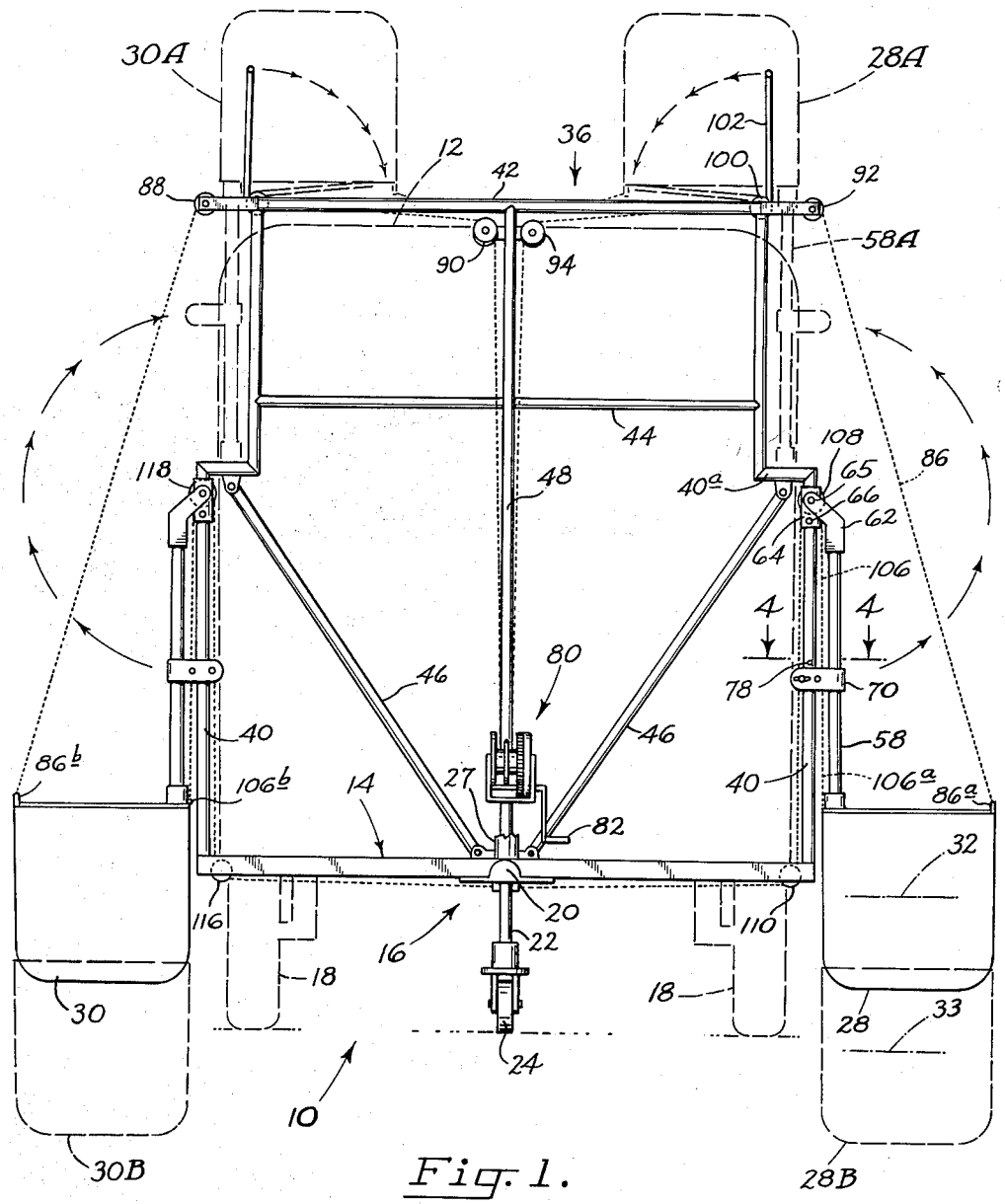
FIG. 1 is an end elevation with portions broken away of the front end of a house trailer provided with pontoon structure as contemplated herein, whereby the house trailer is made amphibious.
Figure 2:
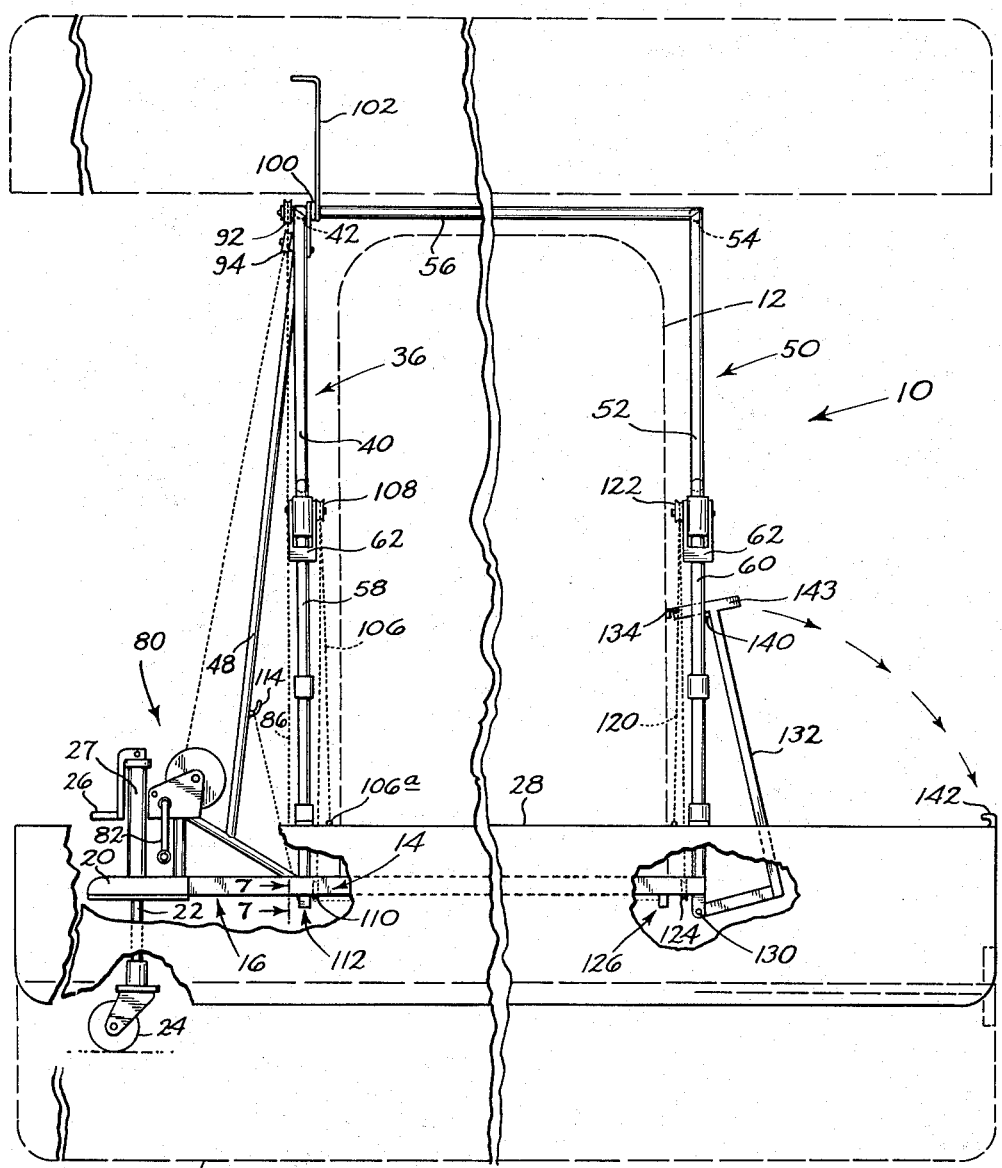
FIG. 2 is a side elevation of the house trailer and pontoon structure shown in FIG. 1, with portions broken away, and with a central portion of the trailer removed to condense the drawing.

In the drawings, where there is shown one embodiment of the invention, and referring more particularly to FIGS. 1 and 2, 10 indicates a house trailer, including a hollow body or cabin shown in dashed outline at 12, which provides living quarters in the trailer. Body 12 is mounted on top of a trailer frame 14, which terminates at the forward end of the trailer in a tongue 16. Journaled on trailer frame 14 beneath body 12 are a pair of lateral support wheels 18.

A trailer hitch 20 is provided at the forward end of tongue 16. Extending downwardly from the tongue is a caster wheel mounting 22, having a wheel 24 journaled at the base thereof. A crank handle 26 at the top of a standard 27 may be actuated when it is desired to raise wheel 24 upon the trailer being attached to a drawing vehicle, such as an automobile (not shown).

The house trailer just described exemplifies one of many different types of presently known house trailers. The house trailer has been described only in a general way, since specific details of its construction are not considered necessary for an understanding of this invention.

The house trailer is amphibious, by reason of the inclusion of pontoon apparatus including a pair of pontoons, indicated at 28 and 30. In their road transport position, pontoons 28, 30 ride over the top of and adjacent the sides of hollow body 12, as shown by dashed outlines 28A, 30A. The pontoons are shiftable from this elevated position to the launch position for the pontoons (shown in full lines), where they are on either side of the trailer and the bottoms of the pontoons are somewhat above the base of wheels 18. In this launch position of the pontoons, the pontoons support the vehicle in water, at a water level indicated at 32 in FIG. 1. The pontoons have still another position, which is lower on the vehicle than the launch position, where the buoyancy of the pontoons is sufficient to hold both the cabin of the trailer and the understructure of the trailer above the water. This position comprises a float position for the pontoons, and is illustrated in the drawings by the dashed outlines 28B and 30B. The water level with the vehicle floating and the pontoons in their float position is indicated at 33 in FIG. 1.

Considering now in more detail the mounting of the pontoons and related structure, fixed to trailer frame 14, and projecting upwardly from a forward part thereof is a forward truss 36. Truss 36 comprises legs 40 on either side of the truss, which are joined at their bottom ends to the frame of the trailer, and a support bar 42 interconnecting the upper ends of legs 40 extending transversely of the trailer. Transverse brace bar 44 joined to legs 40 above angle portions 40a thereof, laterally inclined brace bars 46 extending between the legs and frame 14, and upright rearwardly inclined brace bar 48 extending between bar 42 and the tongue, may be included in the truss to make it completely rigid.

Extending up from frame 14, adjacent the rear of hollow body 12 is a rear truss 50. Rear truss 50 may resemble truss 36, and also includes legs, such as leg 52 shown in FIG. 2, similar to legs 40 in the forward truss, and a support bar 54 extending between the top ends of the legs and joining them together. Suitable brace bars (not shown) may also be included for the purpose of making the rear truss completely rigid.

Forward truss 36 and rear truss 50 are interconnected by longitudinally extending bars such as bar 56. One of these extends between the two trusses adjacent each side of hollow body 12.

The two trusses described, and the bars connecting them form a rigid, skeletal framework, which is rigidly joined to frame 14 of the trailer, and which surrounds the ends and top of hollow body 12. Pontoons 28, 30 are interconnected with the hollow body through this framework. Thus, the pontoons in all of their positions are supported directly on the skeletal framework, and stressing of hollow body 12 is prevented. Support bars 42, 54 define a platform over body 12 upon which the pontoons rest with the pontoons in their elevated or road transport position. The plaform is effective to stablize the pontoons from movement, such as otherwise would result from travel of the trailer over the ground.

The two pontoons are mounted on the trusses described by mechanism which accommodates shifting of the pontoons between their various positions, without disconnecting the pontoons from the truss structure. The mechanism mounting each of the two pontoons is similar, and thus only one is discussed in detail.

Considering, for explanation purposes, pontoon 28, securely fastened to the pontoon, adjacent the forward end thereof, is an arm 58. A similar arm 60 is fastened to the pontoon adjacent its rear end. The two arms are similar, and each terminates at the top end thereof in a yoke member 62. Each yoke member is pivotally connected, through its legs, by pivot means 65, to a sleeve member 64. Sleeve member 64 for arm 58 is vertically slidable on leg 40 in the forward truss, and the sleeve member for arm 60 is vertically slidable on leg 52 in the rear truss.

The sleeve members are locked in an elevated position on the legs, adjacent the angle portions of the legs, by a removable pin, such as pin 66, which extends through the sleeve and an accommodating bore provided in the leg of the truss that mounts the sleeve.

With the sleeve members that mount the two arms in the position shown for member 64 in FIG. 1, pivot connections 65 connecting the yoke and sleeve members are directly under the angle portions in the legs of the trusses. The pivot connections are also adjacent the side of the vehicle. With this position of the pivot connections, on swinging of the arms from their raised position, (such raised position being shown by the dashed outline 58A for arm 58 in FIG. 1), the pontoon connected to the arms (shown at 28A) first has its inner edge raised slightly from the platform defined by suport bars 42, 54. Upon further swinging of the arms, the pontoon moves laterally off this support platform, and downwardly until it reaches its launch position. Yoke members 62 straddle the angle portions of the legs of the trusses with the pontoon raised, and are effective to hold arms 58, 60 laterally outwardly of the truss legs with the pontoon in its launch position.

Figure 4:
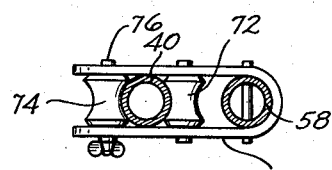
FIG. 4 is a cross-sectional view, taken along the line 4—4 in FIG. 1.

Referring now to FIGS. 1 and 4, each of the pontoon arms has a bracket 70 secured thereto intermediate its ends. As illustrated by arm 58, with the arm lowered, and pontoon 28 in its launch position, the legs of bracket 70 straddle leg 40 of the adjacent truss. Between the legs of the bracket, and journaled on the legs, is a roller 72, which contacts one side of leg 40 with arm 58 lowered.

In FIG. 4, there is shown opposite roller 72, a roller 74 contacting the opposite side of leg 40. This roller is detachably mounted in place, by means of a removable pin 76. Roller 74 is removed when swinging arm 58 between raised and lowered positions, and mounted in place on bracket 70 when shifting pontoon 28 between its launch and its full float position. With arm 58 extending downwardly, and with roller 74 mounted in place, bracket 70 then functions as means guiding arm 58 for vertical movement along leg 40 upon movement of pontoon 28 between launch and float positions.

In shifting pontoon 28 from its launch to its full float position, pins 66 locking the sleeve member in place are removed. This accommodates vertical downward movement of the pontoon arms connected to the sleeves along the legs of the two trusses that now parallel these arms. With a pontoon in its full float position, as shown for pontoon 28 at 28B, the pontoon may be locked in place, by reinserting pins 66 through the sleeves, and bores, such as bore 78, provided in the legs of the trusses.

Figure 5:
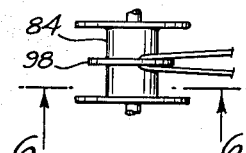
FIGS. 5 and 6 are views, on a slightly enlarged scale, illustrating a winch used in shifting the position of the pontoons.
Figure 6:
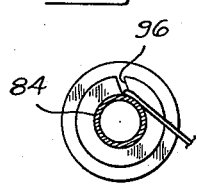

To facilitate shifting the pontoons between their various positions, a winch with ratchet mechanism 80 is provided, mounted above tongue 16 of the frame. Winch 80 is operated by a winch handle 82, and includes a winch drum 84 shown detached from the winch in FIGS. 5 and 6.

A cable 86 secured at end 86a to pontoon 28 and at end 86b to pontoon 30 is wound up on winch drum 84 to produce swinging of the pontoon arms from their lowered to their fully raised position, and thus shifting of the pontoons from their launch to their road transport position.

Further describing the cable, between cable ends 86a, 86b the cable (as shown in FIG. 1) is trained over pulleys 88 and 90 journaled on truss 36 to the left side of brace bar 48 in FIG. 1, and pulleys 92, 94 journaled on truss 36 to the right side of brace bar 48. An intermediate bite portion of the cable fits within slot 96 of annular flange 98 joined to winch drum 84. With the cable so positioned in this slot, when the drum is turned, it should be obvious that the cable is wound up on the drum, with the result that the cable ends are pulled toward the winch drum over the various pulleys described, these ends then being effective to raise the pontoons.

As can be seen with reference to pontoon 28, a spring 100 is securely fastened to an upper part of forward truss 36, which includes a leg 102 which assumes substantially an upright position with the spring in a relaxed state and the pontoon shifted off the support platform. The spring is biased with leg 102 assuming the horizontal position shown in dashed outline in FIG. 1, upon pontoon 28 coming to rest on support bars 42, 54.

To shift a pontoon such as pontoon 28 from its elevated to its launch position, the winch is actuated so as to pay out cable 86 wrapped about the winch drum. With paying out of the cable, the pontoon is released, and spring 100 relaxes, with its leg 102 operating to swing the pontoon upwardly and to the right in FIG. 1. With the pontoon to one side of trailer cabin 12, the force of gravity pulling downwardly on the pontoon causes the pontoon to move into its launch position, on further paying out of cable 86.

Figure 7:
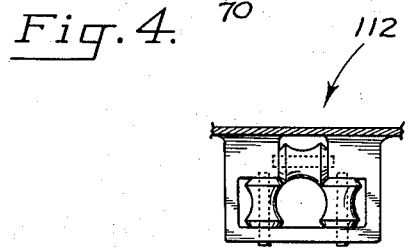
FIG. 7 is a cross-sectional view, along the line 7—7 in FIG. 2, showing fair lead mechanism provided for guiding cables in the structure.

Pontoons 28, 30 may also be shifted from their launch to their full float position, utilizing winch 80. It will be noted in FIG. 1 that another cable 106 with end 106a secured to pontoon 28 extends from end 106a upwardly, whence it is trained about a pulley 108 journaled on sleeve 64. The cable then passes downwardly and over a pulley 110 journaled on frame 14, whence it extends through a fair lead machanism 112 secured to frame 14 (see FIGS. 2 and 7). The cable after passing through fair lead mechanism 112 is held on bar 48 by a hook 114. From hook 114, the cable gain extends downwardly through fair lead mechanism 112, thence about a pulley 116 journaled on frame 14, thence over a pulley 118 journaled on a sleeve member correspondnig to member 64 for pontoon 28, to an end 106b fastened to pontoon 30. As can be seen in FIG. 2, another cable 120 fastened to the pontoon 28 adjacent its rear end extends upwardly from the pontoon, thence about a pulley 122 corresponding to pulley 108 at the forward end of the trailer, thence downwardly about a pulley 124 journaled on frame 14, thence forwardly through a fair lead mechanism 126 (resembling mechanism 112), and thence through fair lead mechanism 112, to hook 114. This cable continues in a similar course back to the rear end of pontoon 30.

When it is desired to shift the pontoons to their full float position, these two cables are released from hook 114, and connected to winch drum 84, in the same manner as described for cable 106. Cable 106 is removed from drum 84. With the various arms for the pontoons released for vertical movement on the truss legs, when the winch drum is turned so as to wind up the cables on the drum, the pontoon arms are forced downwardly on the various legs of the trusses.

The pontoons may be raised from their full float to their launch position by paying out cable from the winch when the vehicle is in the water and buoyed by the pontoons.

Figure 3:
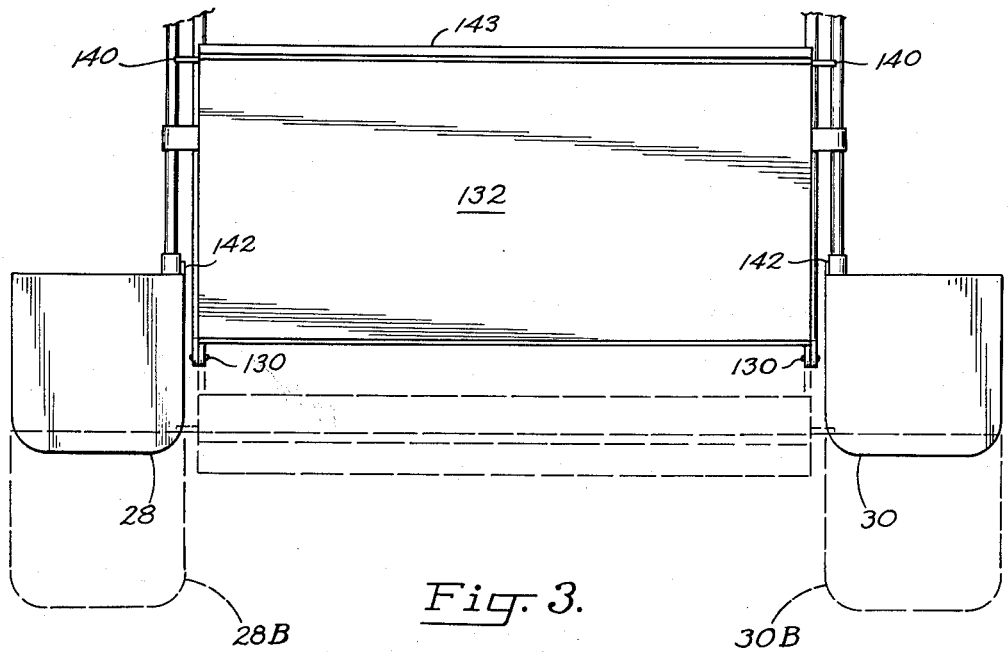
FIG. 3 is an end elevation showing portions of the rear end of the trailer.

A feature of this invention is the provision of platform means, which extends between the two pontoons across the projecting rear set of ends thereof, to provide a deck at the rear of the trailer cabin. Thus, and referring to FIGS. 2 and 3, pivoted at 130 to frame 14 of the vehicle is a platform 132. This platform with the pontoons raised is latched by latch 134, in a substantially vertical position adjacent the rear of the trailer, as shown in FIG. 2. With the pontoons in their launch position, the platform may be unlatched, and swung to the right and downwardly in FIG. 2, to place bar projections 140 extending laterally from the platform under catches 142 mounted on the rear set of ends of the pontoons. Upon shifting of the pontoons from their launch to their full float position, the bar projections slip under catches 142, and as a result, when the pontoons reach their full float position, the platform is locked in position. The platform provides a flat surface extending between the rear ends of the pontoons to enable a person to walk between the two pontoons. A transom 143 is secured to the platform, and provides a means for mounting an outboard motor or other power means for propelling the vehicle when the same is in water.

From the above description, it should be obvious that the invention contemplates a number of novel features whereby a land vehicle may be converted to marine use. The pontoons in their fully raised position may be held firmly down on the platform defined by bars 42, 54, through the cables described. The pontoons are readily shifted from this position to their other positions without disconnecting the pontoons from the truss structure supporting them. With the pontoons in their launch position, the bottoms of the pontoons are somewhat above the base of the wheels, but are sufficiently low to support the trailer in the water with cabin 12 out of the water. The pontoons are also adjustable to their full float position, to place the pontoons in a position where they support cabin 12 and substantially the entire understructure of the trailer above the water.

The pontoons upon shifting between launch and full float positions are shifted substantially vertically, and in this way provide proper buoyancy while remaining upright. When shifted between their launch and elevated positions, the pontoons in addition to moving vertically also move laterally inwardly, so that they come to rest laterally inwardly of the sides of cabin 12.

The truss structures described support the pontoons independently of the trailer cabin.

While an embodiment of the invention has been described, variations and changes are possible without departing from the invention. It is desired to cover all such modifications as would be apparent to one skilled in the art, and that come within the scope of the appended claims.

It is claimed and desired to secure by Letters Patent:

1. In combination with a vehicle having wheel support and a hollow cabin body disposed over said wheel support,
   a pontoon adjacent each side of the vehicle,
   mechanism for each pontoon securing the pontoon in a fixed position relative to the vehicle with the base of the pontoon above the base of said wheel support and below the base of said hollow cabin body,
   means for adjusting said mechanism whereby the pontoon occupies a position disposed to the side of the vehicle with the base of the pontoon below the base of said wheel support, and is secured from movement in this position, and
   means for adjusting said mechanism whereby the pontoon occupies a position with the base of the pontoon adjacent the top of said hollow cabin body and is secured from movement in this position.

2. The combination of claim 1, wherein said mechanism on adjustment of the same defines a path of travel for the pontoon between said various positions with said path of travel extending downwardly along the side of said hollow body on movement of the pontoon between its first and second-mentioned positions, and extending upwardly and with a laterally inwardly directed component on movement of the pontoon between its first and third-mentioned positions.

3. An amphibious vehicle comprising
a frame,
a hollow cabin body fastened to and supported on the top of said frame,
lateral support wheels journaled on said frame below said hollow cabin body with the base of the wheels below the base of said frame,
a pontoon disposed in an elevated position over said hollow cabin body adjacent each side thereof, and
mechanism for each pontoon mounting the pontoon on said frame independently of said hollow cabin body,
said mechanism comprising means accommodating shifting of the pontoon while the same is mounted on and connected to said frame from its said elevated position to a launch position where the base of the pontoon is below the base of the hollow cabin body and above the base of said wheels,
said mechanism further including means for shifting the pontoon from its launch position to a float position where the base of the pontoon is below the base of said wheels, and
means for fixing the pontoon in its said launch and float positions.

4. In a marine vehicle, the combination of a hollow cabin body,
a pair of pontoons disposed adjacent the top of said body with one adjacent each side thereof, and
mechanism for each pontoon operatively interconnecting the pontoon and hollow body,
said mechanism comprising an arm,
pivot means connecting one end of said arm to said vehicle with the arm pivotable about an axis extending longitudinally of the vehicle,
means connecting the other end of said arm to the pontoon,
means mounting said pivot means accommodating its movement in a vertical direction adjacent one side of said vehicle, and
means for fixing said pivot means in different positions adjacent said one side of the vehicle.

5. A marine vehicle comprising
a frame,
a hollow cabin body mounted on the top of said frame,
a truss rigidly joined to said frame disposed to the front of said hollow body and another truss rigidly joined to said frame disposed to the rear of said hollow body,
said two trusses including means disposed over said hollow body defining a support platform above said hollow body,
a pair of pontoons disposed over said hollow body resting on said support platform defined by said trusses, and
mechanism for each pontoon connecting the pontoon to said pair of trusses,
said mechanism comprising a pair of arms,
connecting means connecting one set of ends of the arms to the pontoon, and
connecting means connecting the other set of arms to the two trusses, one to each truss,
said last-mentioned connecting means including pivot means accommodating pivoting of the arms between a raised position where the pontoon rests on said platform and a lowered position where the pontoon is disposed adjacent the base of said hollow body,
at least one of said connecting means including means accommodating shifting of the pontoon in a direction extending along the length of the arms.

6. A marine vehicle comprising
a frame,
a hollow cabin body mounted on the top of said frame,
a truss rigidly joined to said frame disposed to the front of said hollow body and a second truss rigidly joined to said frame disposed to the rear of said hollow body,
a pair of pontoons, and
means operatively interconnecting the pontoons and said frame,
said last-mentioned means comprising, for each pontoon, a pair of arms connected at one set of ends to the pontoon,
a vertically movable member for each arm,
means in each truss movably supporting one of said vertically movable members, and
means pivotally connecting the ends of said arms opposite their said one set of ends to said vertically movable members, one to each member.

7. The vehicle of claim 6 which further comprises means for locking said vertically movable members in both raised and lowered positions on said trusses.

8. In a marine vehicle including a hollow cabin and a pair of pontoons, one positioned adjacent each side of said cabin in an elevated position over the top of said cabin, a mounting for each pontoon comprising
a pair of upright arms operatively interconnecting the cabin and pontoon, having an upper set of ends connected to the pontoon and having a lower, opposite set of ends disposed adjacent a side of said cabin between the top and bottom thereof,
pivot means for said opposite set of ends of said arms accommodating swinging of the arms to place their said upper set of ends adjacent the bottom of said cabin and the pontoon in a lowered position facilitating launching of the vehicle,
structure downwardly shiftable along said side of said cabin having said pivot means mounted thereon, and
means actuatable to force said structure downwardly thus to further lower the pontoon.

9. In combination with a vehicle including a hollow body and lateral support wheels disposed below said body,
a pair of pontoons, one positioned adjacent each side of said body in an elevated position over the top of said body, and
adjustable mechanism for each pontoon operatively interconnecting the body and pontoon accommodating shifting of the pontoon from said elevated position to launch and float positions, respectively, in that order, without disconnecting the pontoon from the body,
said mechanism for each of said pontoons including means whereby the pontoon in its said launch position is held immovably on the side of said body with the base thereof below the base of said body but above the base of said support wheels, and including means whereby the pontoon in its said float position is held immovably lower down relative to said body with the base of the pontoon below the base of said support wheels,
said adjustable mechanism for each pontoon further including means defining a path of travel for the pontoon extending downwardly and with a laterally outwardly directed component on the pontoon moving from its elevated to its launch position, whereby the pontoon may be shifted laterally outwardly of said body, and means defining a substantially linear downward path on the pontoon moving from its launch to its float position.

10. An amphibious vehicle comprising a frame, a hollow cabin fastened to and supported on the top of said frame, lateral support wheels journaled on the frame with the base of the wheels below the base of the frame adapted to support the vehicle for movement over the ground, a pontoon disposed in an elevated position over said hollow cabin adjacent each side thereof, and mechanism mounting said pontoons on said frame accommodating their movement from their said elevated position over said hollow cabin, said mechanism comprising for each pontoon means accommodating shifting of each pontoon from its said elevated position to a float position where the base of the pontoon is below the base of said wheels, and means for securing the pontoon in its said float position, said mechanism holding the pontoon attached to the frame while the same is moved from its said elevated position to its float position, and defining for the pontoon a launch position where the base of the pontoon is below the base of the hollow cabin and above the base of the wheels.

11. In combination with a vehicle including a hollow cabin and lateral support wheels disposed below the cabin, a pair of pontoons, one positioned adjacent each side of said cabin in an elevated position over the top of the cabin, and adjustable mechanism for each pontoon operatively interconnecting the cabin and the pontoon accommodating shifting of the pontoon from its said elevated position to launch and float positions, respectively, in that order without disconnecting the pontoon from the cabin, said mechanism for each of said pontoons including means whereby the pontoon in its said launch position is located on the side of the body with the base thereof below the base of the cabin but above the base of said support wheels and including means whereby the pontoon in its said float position is held lower down and immovably relative to said body with the base of the pontoon below the base of said support wheels, said adjustable mechanism for each pontoon further including means defining a path of travel for the pontoon extending downwardly and with a laterally outwardly directed component on the pontoon first moving from its elevated response position whereby the pontoon may be shifted laterally outwardly of said body, and means defining a substantially linear downward path on the pontoon moving from its launch to its float position.

References Cited by the Examiner
UNITED STATES PATENTS

| | | | |
|---|---|---|---|
| 1,683,276 | 9/28 | Woods | 114—61 |
| 2,361,951 | 11/44 | Livermon | 9—1 |
| 2,727,484 | 12/55 | White | 9—1 X |
| 3,090,975 | 5/63 | Franks | 9—1 |
| 3,091,208 | 5/63 | Copeland et al. | 115—1 |

FERGUS S. MIDDLETON, *Primary Examiner.*